United States Patent
Meurer

(10) Patent No.: US 8,124,935 B2
(45) Date of Patent: Feb. 28, 2012

(54) PROCEDURE FOR THE DETECTION OF IONIZING RADIATION

(76) Inventor: Heinrich Meurer, Bruhl (DE)

( * ) Notice: Subject to any disclaimer, the term of this patent is extended or adjusted under 35 U.S.C. 154(b) by 9 days.

(21) Appl. No.: 12/563,364

(22) Filed: Sep. 21, 2009

(65) Prior Publication Data

US 2010/0072367 A1 Mar. 25, 2010

(30) Foreign Application Priority Data

Sep. 19, 2008 (DE) .......................... 10 2008 048 036

(51) Int. Cl.
*G01T 1/11* (2006.01)
(52) U.S. Cl. ...................................................... 250/337
(58) Field of Classification Search .................. 250/337
See application file for complete search history.

(56) References Cited

U.S. PATENT DOCUMENTS

| | | | | |
|---|---|---|---|---|
| 3,665,194 A | * | 5/1972 | Alter et al. ...................... | 250/253 |
| 4,587,847 A | * | 5/1986 | Malmqvist et al. ........... | 73/28.01 |
| 5,972,638 A | * | 10/1999 | Burlage et al. ................... | 435/29 |
| 6,822,742 B1 | * | 11/2004 | Kalayeh et al. ................ | 356/437 |
| 2006/0222207 A1 | * | 10/2006 | Balzer et al. .................. | 382/104 |

OTHER PUBLICATIONS

Min et al., "Detection of radiation effects using recombinant bioluminescent *Escherichia coli* strains," 2000, Radiation Environmental Biophysics, vol. 39, pp. 41-45.*
S.F. D'Souza, "Micorbial biosensors," 2001, Biosensors & Bioelectronics, vol. 16, pp. 337-353.*
Stewart et al., "Laser-induced fluorescence imaging and spectroscopy of GFP transgenic plants," 2005, Journal of Fluorescence, vol. 15, No. 5, pp. 697-705.*
Stewart et al., "Plants that detect landmines, and other biosensors," Feb. 2001, downloaded from http:/www.isb.vt.edu/articles/feb0106.htm.*
Anderson et al., "Hyperspectral fluorescence remote sensing of landscape molecular probes," May 2008, ASPRS 2008 Annual Conference, Portland, Oregon.*
P. V. Panova, "The Airborne remote systems for offshore oil seepage detection," 2005, Scientific Conference "Space, Ecology, Safety" wioth International Participation, Barna, Bulgaria, pp. 236-241.*
Hengstermann et al., "Multirole data acquistion on operational and scientific aircraft," 2004, Germany.*

* cited by examiner

*Primary Examiner* — David Porta
*Assistant Examiner* — Kiho Kim
(74) *Attorney, Agent, or Firm* — Mannava & Kang, PC

(57) ABSTRACT

The present invention relates to a procedure for detection of ionizing radiation and its sources whereby living biosensors are spread-out over a terrain to be examined and which are able by the ionizing radiation to stimulate the production of fluorescent substances whereby their fluorescent radiation is detected from the distance.

15 Claims, 2 Drawing Sheets

PROCEDURE FOR THE DETECTION OF IONIZING RADIATION

Figure 1:
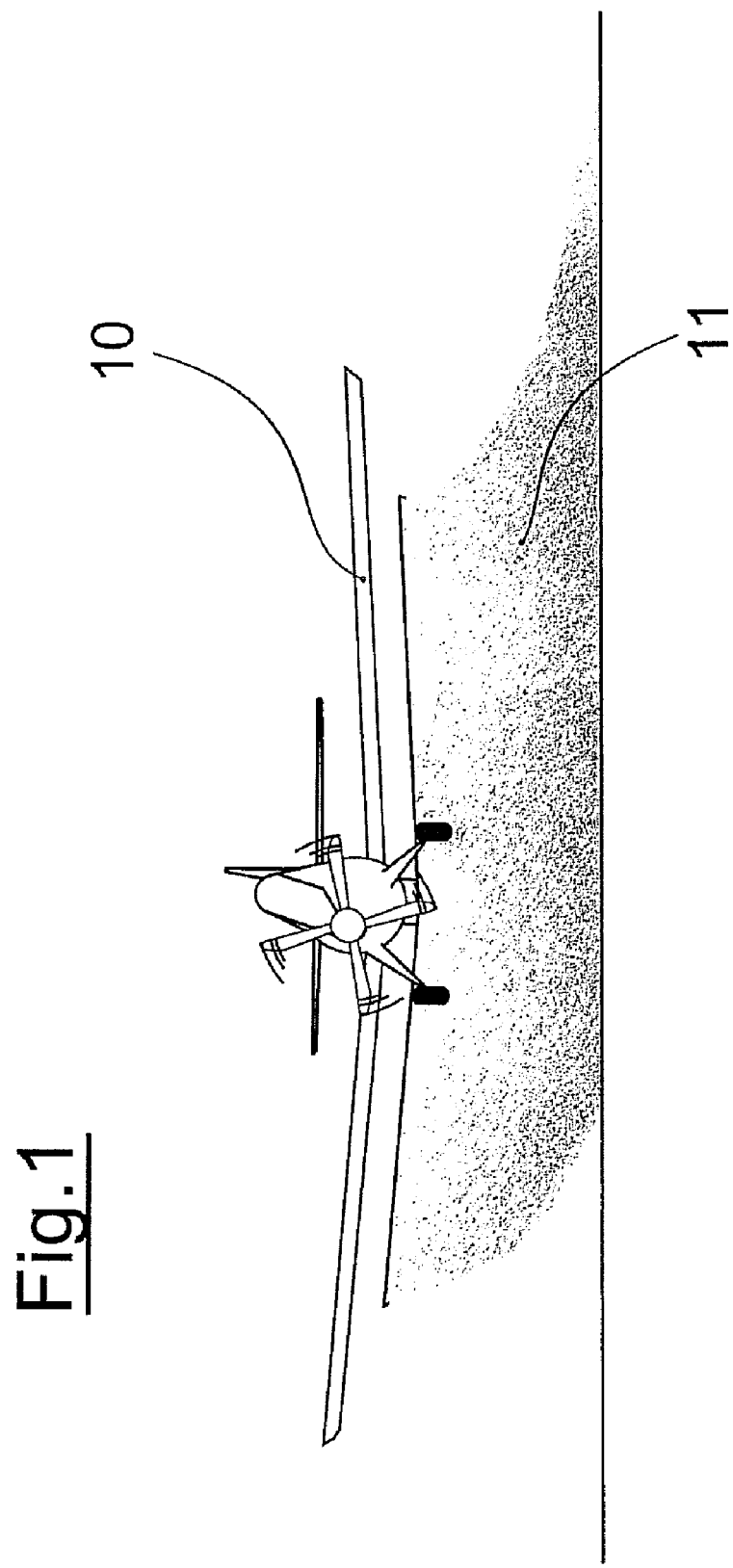

The present invention refers to a procedure for the detection of ionizing radiation and its sources.

Ionizing radiation includes both, electromagnetic radiation—such as X-ray radiation and gamma radiation—and particle radiation—such as alpha radiation, beta radiation and neutron radiation. It is characterized that it carries enough energy to ionize atoms and molecules, i.e. to generate positive or negative particles from electrical neutral atoms and molecules. When passing a matter, for instance a cell or an organism, the ionizing radiation discharges energy. When being sufficiently high, this can lead to serious radiation damages.

Ionizing radiation can be found both, in the nature and as a result of human activity. Natural radioactive materials are present in human beings as well as in the soil and rocks of the earth's crust. In medical science, research, technology and by the exploitation of atomic energy, radioactive materials are specially used and generated artificially.

EP 1 693 642 A1 shows an aerial-supported (airborn) procedure for the detection of landmines which uses biosensors that, when interacting with traces of explosives, are stimulated to produce fluorescent proteins and hereby activated. By means of a laser beam of an aerial-supported (airborn) laser scanner, these biosensors are stimulated, so that they produce fluorescent signals which then can be detected from the air, simultaneously with the reflected signal of the laser beam on the ground surface, allowing to create a digital terrain model of the ground surface, in which the fluorescent signal is integrated. This digital terrain model, for example, can be represented on a data display unit or as a map. By referring to the detailed description in this paper with view to the procedure of the fluorescence detection by aerial-supported (airborn) laser scanning, as well as the creation of a digital terrain model of the ground surface by using the surface reflection signal of the laser beam, they are subject of the disclosure of the present invention as well.

According to the state of the art a general problem exists for the detection of ionizing radiation and its sources that the intensity of the ionizing radiation (such as radioactive radiation) diminishes with the square of the distance and is superimposed by the ionizing background radiation existing in the nature. In practice, this means that an atomic explosive in a distance of more than 25-30 m can not be distinguished any more from the natural ionizing background radiation and therefore can not be detected. The "measurable" range of the alpha radiation in the air is as short as 0.05 m, that of beta radiation is about 4 m and that of gamma radiation is about 50 m. The successful detection of radiation sources with usual procedures, e.g. using a Geiger counter, is based on an extreme small-sized and time-consuming scanning of the ground surface and a careful guidance of the detector near the ground. Better measuring results and higher degrees of sensitiveness of the detectors can be achieved at most by bigger detector measuring intake ports, longer measuring intervals and reduction of distance between radiation source and detector.

Here, the present invention steps in. Starting from the above mentioned problems, the task of the present invention consists of providing a procedure which allows ionizing radiation and its sources of the kind as described before, to be detected over longer distances than conventional procedures.

The solution of this task is provided by a procedure for detecting ionizing radiation and its sources of the kind as mentioned before with the characteristic features of the principal claim. According to the present invention, living biosensors are used as detectors which through ionizing radiation are suitable to stimulate the production of fluorescent compounds (e.g. proteins), whereby then from the distance, e.g. from an airborne platform, especially by means of a LIDAR (light detection and ranging) system, the biosensors can be stimulated to produce fluorescent radiation which can be detected and geo-referenced, if required.

With the solution of the present invention, the distance between the detector/the biosensor and the ionizing source is minimised and thus the measurable radiation for the detector/the biosensor is maximised. The distance reduction also has the advantage that only the signal coming from the ionizing source is being amplified, and not the signal of the background radiation.

The procedure according to the present invention allows to detect ionizing radiation and its sources in the distance and thus opens new possibilities for the examination, the detection and the high definition geo-referencing of radiation sources. The ionizing radiation is demonstrated by measuring qualitatively or quantitatively the production of fluorescent substances (e.g. proteins) as a reaction of living biological material to this radiation.

With the procedure according to the present invention, in addition preferably a ground-based platform can be used (e.g. including a truck), in order to also enable detection in urban areas with narrow space between high buildings where for a sensor aircraft the danger of coverage/shading of the sensors prevails.

Moreover, according to further developments of the invention, applications are possible, for example, where a spray or substrate containing the biosensors is spread over the inside of sea containers or other transport containers. On arrival at the destination of the containers, the biosensors are examined for impacts by ionizing radiation. In this application the travelling time of the transport container to its destination is used as measuring time. Hereby, because of long travelling times—for example of sea containers in intercontinental traffic—probably even weakest or well shielded and hidden sources of ionizing radiation in transport containers can be detected by the considerably extended measuring time.

In the present invention, preferably single-cell living organisms are taken into account, especially some radiation-resistant soil bacteria or yeasts. They are radiation-resistant, because they have an especially effective repair-mechanism for their DNA.

The initiation of this repair-mechanism, as a reaction on an otherwise health detrimental exposure by ionizing radiation is used as trigger for the production of fluorescent, detectable proteins in the biosensor cell. Harmless bacteria or yeasts can be used which for example are genetically manipulated in order to produce a signal which can be detected from the air or from a distance (qualitative measuring) as soon as they are exposed to ionizing radiation. This detectable signal of the biosensor is the well-known production of fluorescent proteins in the cell/the biosensor.

In the biosensor the production of these fluorescent proteins is genetically linked directly with a naturally initiated repair mechanism of the cell for damages caused by ionizing radiation. Such damages could be, for instance, fractures in the double helix of the DNA or an increased, cell damaging level of free radicals (ionized hydrogen atoms or ionized oxygen atoms) in the cell.

By the direct genetic linkage of the repair mechanism with the production of fluorescent proteins, the invention creates a biosensor for ionizing radiation.

In order to be able to detect particularly intensive sources of ionizing radiation, preferably biosensors of bacteria or yeasts are used which are especially tolerant or resistant to radiation, as the case may be, for example Deinococcus radiodurance R1.

Contrarily to typical procedures used so far, the invention allows to choose nearly any size of detector surface, that means in this case, the number of biosensors on the surface and the density of biosensors on this surface. The measuring intervals to detect ionizing radiation both, in the field and in the containers to be examined, can be nearly chosen arbitrarily long, depending on the survival capability of the biosensors under the strain of radiation. The detection distance between the source of ionizing radiation to be detected and the detector (biosensor) can be practically reduced to zero, since the biosensors, as a cloud of aerosol can touchdown directly on the source or its container. Thus, the well known characteristics for the sensitivity of a measuring system for detection of ionizing radiation, such as detector surface, measuring interval, measuring distance to the radiation source, can be easily optimised.

The procedure of the present invention allows aerial-supported, extensive terrain reconnaissance with precise geo-referencing and high definition of the detected radiation sources. The latter is of utmost importance to the "first responder" on the ground for the rapid identification of contaminated terrain and the definition of safe evacuation routes.

The procedure in its aerial-supported (airborn) embodiment avoids any hazard of radiation exposure for the survey team. The risk of contamination and incorporation of ionizing particle, for example by the fallout of a radiological bomb is minimised at a very high degree.

Preferably, according to a further development of the procedure, a quantitative measurement of the ionizing radiation is intended which can be realised by using biosensors with different radiation intensities. Hereby it can be experimentally defined at which radiation exposure, beyond the natural background radiation, different micro-organisms initiate their repair mechanism.

In general, the biosensors touchdown directly on the surface of an object which is emitting ionizing radiation, especially in form of a fall-out from an aerosol cloud. With strong radiation sources, which, for simplification can be symbolised as punctual sources, even radiation resistant biosensors are unable to survive ionizing radiation, depending on the time of exposure.

In the centre of the source and at a distance X to the centre, biosensors (of different radiation intensity) can not create fluorescent proteins as signals, as they die off earlier. In the aerial photograph or detection graph one has to count with a part of the surface without signal where no fluorescent proteins can be detected. This surface is surrounded by a fluorescent halo, created by surviving biosensors with activated repair mechanism. From the size and the distance of the halo to the centre, conclusions on the intensity of the radiation source can then be made.

This relationship can also be used in accordance with a possible variation of this invention, in order to build a "lights out" biosensor. Such a biosensor would be already stimulated to produce a fluorescent protein at the time of touchdown when adding agents to the spraying liquid. The biosensors which fall onto the sources of ionizing radiation would not have the time to create fluorescent proteins or build them completely, as they die off earlier by the radiation. With no sufficient lifetime, no fluorescent light of biosensors could be expected from the air in the vicinity of the source of ionizing radiation.

Possible applications for the procedure of the present invention are for example:

the detection of radiological bombs (dirty bombs), atomic explosives and highly enriched weapon-grade uranium. Herewith mass destruction weapons and the possibly illegal production or storage of enriched and weapon-grade uranium, as the case may be, can be detected. The detection can be executed rapidly and extensively, as the capacity per day of aerial-supported (airborn) LIDAR systems presently is in the order of 50 to 100 km$^2$. For a network of required spraying planes, comparable capacities per day can also be achieved without any problem. The described detection can be performed at distance, especially from the air, by an unmanned sensor plane at low height (UAV), so that the procedure can also be used over the territory of states whose permission has not been obtained;

the detection in the environment of the points of impact of discharged, armour-piercing ammunition, using depleted uranium (DU). On the detonation of an uranium shell, the uranium is burning out and among other things is producing highly toxic uranium oxide which settles as mist of finest particles around the point of impact.

the detection of radioactive leakages and settlements from atomic power plants, both normally operating plants and those with problems. There is the possibility, for example, to adjust such maps with a leukaemia atlas.

the exploration of uranium ore forecasts of earthquakes and volcanic eruptions. Due to the formation of tensions and due to changed pressure conditions in the approaches of earthquakes and volcanic eruptions, the naturally existing radioactive noble gas radon escapes more intensively from the ground. These gas outlets can be detected extensively by the procedure of the present invention, possible deformations and regions of disturbance in the ground can be mapped by using the particularly increased radon gas outlets in these regions and forecasts of immediately forthcoming earthquakes or volcanic eruptions worked out that allow a well-founded evacuation decision;

working-out a radon atlas with view to the expected gamma dosage rate for each location.

Hereafter, a preferred sequence of the steps for a procedure of the present invention is laid down:

First the biosensors are spread-out from the air, for example in form of aerosol, over the area which has to be examined. There they touchdown immediately on the ground surface. With an existing radiation source, the micro-organism will there be damaged and initiate their repair mechanism to repair, for example, damages in the DNA. Hereby fluorescent proteins are produced which can be detected from the distance by the aerial-supported (airborn) platform. Since at the same time, preferably by LIDAR, a digital surface model of the examined area is being made, the detected radiation sources can be assigned to their individual geodetic co-ordinates.

The features described in the sub-claims refer to preferred further developments of the task solution according to the present invention.

Hereafter, the present invention is described more in detail for an example of an embodiment with reference to the attached drawing. Hereby demonstrate:

FIG. 1 a simplified schematic sketch which shows how the biosensors are spread-out by plane over a flat area.

Figure 2:
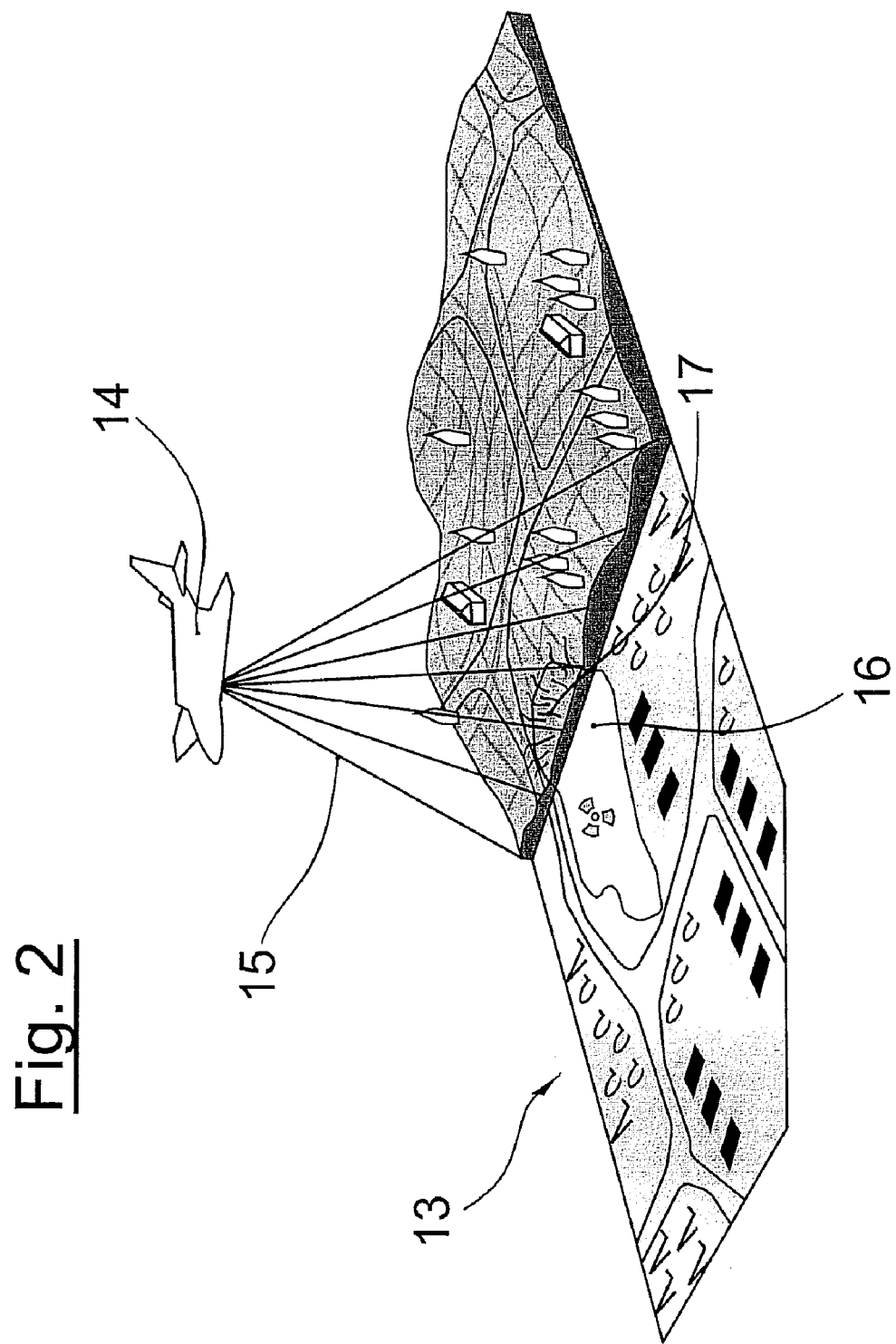

FIG. 2 another simplified schematic sketch which shows the stimulation and detection of the stimulated biosensors from the air by a fixed wing aircraft.

For the preparation of a suitable biosensor solution, for example, freeze-dried starter cultures of the microbial biosensors are mixed with water and nutrients which form a compact aqueous spray solution with functional biosensors. This mixing procedure can be executed by simple means, also on advanced airfields and needs only a few hours.

Then, for example, an agricultural aircraft 10 with modern flight control systems is used, in order to allow at low-level flights to spray as uninterruptedly as possible suspected areas with the biosensor solution 11, as shown in FIG. 1.

Thereafter the areas 13 where the biosensors were brought-out, are over-flown, using a fixed wing aircraft 14 in which a platform for stimulation laser and laser scanner were mounted. The aircraft flies over the areas in a height of 800 to 1000 m. The stimulation laser 15 illuminates the ground 13 by a wavelength suiting the fluorescence of the protein in accordance with the used biosensor. With the biosensors activated by ionizing radiation, the then produced fluorescent proteins 16 are stimulated to radiation 17 by the laser and simultaneously detected by the laser scanner 15, defined with their intensity and then geo-referenced.

REFERENCE LIST OF NUMBERS

10 Agricultural plane
11 Biosensor solution
12 Ground
14 Fixed wing aircraft
15 Laser scanner
16 Fluorescent proteins
17 Stimulated radiation

The invention claimed is:

1. Procedure for the detection of ionizing radiation and their sources, wherein living biosensors are spread over a terrain or object to be examined, and are capable to stimulate the formation of fluorescent substances, then the spread biosensors are stimulated to fluorescent radiation from an airborne platform, the biosensors being stimulated to produce fluorescent radiation which can be detected and geo-referenced if required, wherein a qualitative measurement is included by which sources of ionizing radiation are detected and assigned to their respective geodetic coordinates.

2. Procedure according to claim 1, wherein the fluorescence is stimulated and detected via a LIDAR system (light detecting and ranging).

3. Procedure according to claim 1, wherein a spray liquid or a substrate containing the biosensors is spread over the inside surfaces of sea containers or other transport containers is spread and the biosensors are examined for exposure by ionizing radiation at the destination of the transport containers.

4. Procedure according to claim 1, wherein a so called "lights out" biosensor is used which is stimulated to produce fluorescent substances shortly before spraying over the area under examination whereby the absence of any fluorescence is the proof for a source of ionizing radiation.

5. Procedure according to claim 1, wherein radiation-resistant bacteria or yeasts are used as biosensors which produce a signal that can be detected from the air.

6. Procedure according to claim 5, wherein genetically engineered micro-organism is used.

7. Procedure according to claim 5, thereby characterised that wherein the biosensor comprises deinococcus radiodurance R1.

8. Procedure according to claim 1, wherein a quantitative measurement of the ionizing radiation is included which is realised by using different radiation-intensive biosensors, whereby the intensity of the source of ionizing radiation is derived from the magnitude and/or geometry of the detection picture.

9. Procedure according to claim 1, wherein the biosensors are spread-out flat from the air by a cloud of aerosol over an area which has to be examined.

10. Application of the procedure according to claim 1 for detection of radiological bombs, atomic explosives and highly enriched uranium (HEU).

11. Application of the procedure according to claim 1 for detection of discharged armour-piercing ammunition containing depleted uranium (DU).

12. Application of the procedure according to claim 1 for detection of radio-active leakages or settlements from atomic power plants, both normally operating plants and those with problems.

13. Application of the procedure according to claim 1 for the exploration of deposits of uranium ore.

14. Application of the procedure according to claim 1 for the elaboration of forecasts of earthquakes and volcanic eruptions by detection of radon gas escapes from the ground.

15. Application of the procedure according to claim 1 for locating and mapping the radiation exposure of natural radon occurrence at the surface of the ground.

* * * * *